(12) United States Patent
Abgrall et al.

(10) Patent No.: US 8,504,010 B2
(45) Date of Patent: Aug. 6, 2013

(54) DISTRIBUTED POWER ALLOCATION METHOD UNDER SERVICE QUALITY CONSTRAINT

(75) Inventors: Cédric Abgrall, Grenoble (FR); Emilio Calvanese Strinati, Grenoble (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 151 days.

(21) Appl. No.: 13/177,709

(22) Filed: Jul. 7, 2011

(65) Prior Publication Data

US 2012/0021757 A1  Jan. 26, 2012

(30) Foreign Application Priority Data

Jul. 26, 2010  (FR) ...................... 10 56113

(51) Int. Cl.
*H04B 7/00* (2006.01)
*H04B 7/185* (2006.01)
*H04W 4/00* (2009.01)

(52) U.S. Cl.
USPC ......... 455/422.1; 370/318; 370/328; 455/522

(58) Field of Classification Search
USPC ................... 455/509, 522, 422; 370/338, 329
See application file for complete search history.

(56) References Cited

U.S. PATENT DOCUMENTS

| | | | | |
|---|---|---|---|---|
| 8,346,291 | B2 * | 1/2013 | Guey | 455/522 |
| 2006/0268787 | A1 * | 11/2006 | Strutt et al. | 370/335 |
| 2008/0159215 | A1 | 7/2008 | Hosein | |
| 2009/0082054 | A1 * | 3/2009 | Li et al. | 455/522 |
| 2009/0186648 | A1 * | 7/2009 | Larsson | 455/522 |
| 2012/0028667 | A1 * | 2/2012 | Larsson | 455/509 |

FOREIGN PATENT DOCUMENTS

| | | |
|---|---|---|
| WO | WO 2006/127314 A2 | 11/2006 |
| WO | WO 2007/126346 A1 | 11/2007 |
| WO | WO 2010/064110 A1 | 6/2010 |

OTHER PUBLICATIONS

U.S. Appl. No. 13/178,769, filed Jul. 8, 2011, Abgrall, et al.
European Search Report issued Aug. 26, 2011, in European Patent Application No. 11 17 3774 with English translation of category of cited documents.

(Continued)

*Primary Examiner* — George Eng
*Assistant Examiner* — Nizar Sivji
(74) *Attorney, Agent, or Firm* — Oblon, Spivak, McClelland, Maier & Neustadt, L.L.P.

(57) ABSTRACT

A method of power allocation in a wireless telecommunication system including at least a first couple of terminals, including a first transmitting terminal and of a first receiving terminal, and of a second couple of terminals, including a second transmitting terminal and a second receiving terminal. After a phase of initialization of the allocated powers, a plurality of iterations are carried out, each iteration including a first half-iteration, which is the task of the first couple of terminals, and a second half-iteration which is the task of the second couple of terminals. Each half-iteration includes a step of estimating the signal-to-noise and interference-to-noise ratios by the receiving terminal, and a step of calculating the minimum output power compatible with the treatment of the interference, for the prescribed throughput of the call in question.

14 Claims, 8 Drawing Sheets

OTHER PUBLICATIONS

Jong-Shi Pang, et al., "Distributed Power Allocation With Rate Constraints in Gaussian Parallel Interference Channels", IEEE Transactions on Information Theory, vol. 54, No. 8, XP-011231453, Aug. 1, 2008, pp. 3471-3489.

Siamak Sorooshyari, "On Distributed Power Allocation for Rate-Constrained Wireless Networks", Information Sciences and Systems, 2006 40th Annual Conference on IEEE, PI, XP-031011875, Mar. 1, 2006, p. 474.

Shih-Chun Chang, et al., "Coding for T-User Multiple-Access Channels", IEEE Transactions on Information Theory, vol. IT25, No. 6, Nov. 1979, pp. 684-691.

* cited by examiner

DISTRIBUTED POWER ALLOCATION METHOD UNDER SERVICE QUALITY CONSTRAINT

TECHNICAL FIELD

The present invention relates generally to the field of wireless telecommunication systems and more particularly to a method for allocating power within such a system.

PRIOR STATE OF THE ART

One of the problems affecting a call within a cellular telecommunication system is that of interference generated by other calls in the cell or in neighboring cells. Conventionally intercellular interference due to calls in neighboring cells is distinguished from intracellular interference due to calls within the same cell as that in which the terminal is located.

Many techniques have been proposed and implemented to reduce intracellular interference. Most of these techniques are based on allocation of orthogonal transmission resources, for example of transmission time intervals (TDMA), of transmission frequencies (FDMA), of the subcarrier intervals of an OFDM multiplex (OFDMA), of transmission codes (CDMA), of transmission beams (SDMA), or of some combination of such resources, so as to separate the different calls within the same cell.

Transmission resources being scarce, these are generally reused, at least partially, from one cell to another. A resource management or RRM (Radio Resource Management) module is then put in charge of statically or dynamically allocating transmission resources to the different cells. It is known, in particular, to statically reuse transmission frequencies according to a bidimensional scheme (Frequency Reuse Pattern).

Due to the reuse of transmission resources, a first call between a first terminal and a first cell base station can be interfered with by a second call, using the same transmission resource, between a second terminal and a second base station of a neighboring cell. The situation is even more critical when the cells are adjacent and the terminals are at the cell boundary. In this case, the terminals must transmit at full power and the interference level is then high.

For a given call, referred to here as the first call, the interference induced by a second call using the same transmission resource as the first is commonly called intraband interference. Conversely, that induced by a second call using a different transmission resource (for example a neighboring transmission frequency or another transmission interval) from that used by the first, is called interband interference.

Figure 1:
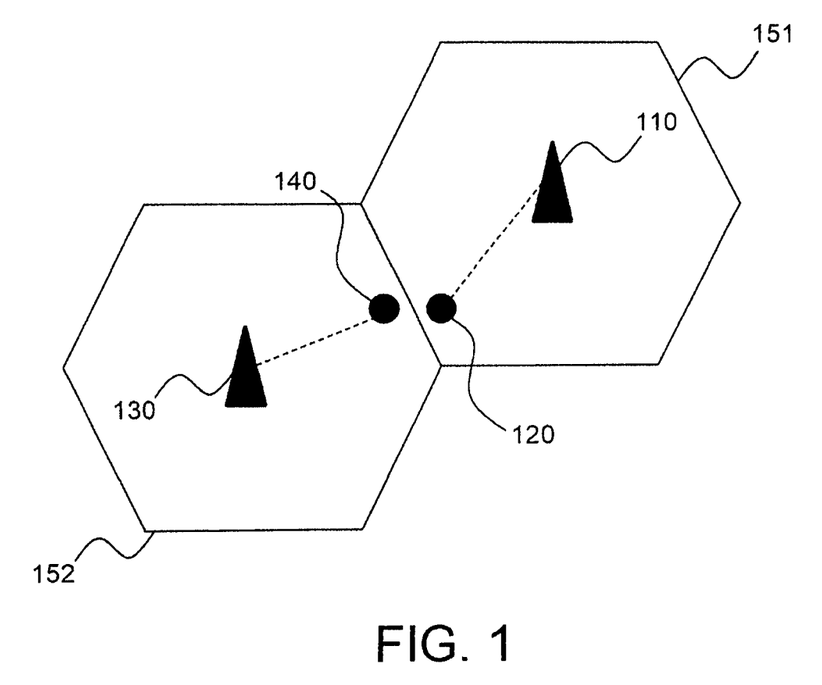
FIG. 1 shows schematically an intercellular intraband interference situation in a cellular communication system.

FIG. 1 shows a highly simplified cellular telecommunication system, comprising two cells 151 and 152. The first cell 151 contains a first couple of terminals consisting of a first transmitting terminal 110 and of a first receiving terminal 120. Similarly, the second cell 152 comprises a second couple of terminals consisting of a second transmitting terminal 130 and of a second receiving terminal 140. By terminal is meant here a mobile terminal or a base station, or even a relay terminal in the case of a relayed channel. In particular, it will be understood that both uplink calls and downlink calls are considered here. It is also assumed that the first call between terminals 110 and 120 uses the same transmission resource(s) as the second transmission between terminals 130 and 140, such that the two calls interfere with one another.

The treatment and the reduction of intercellular interference have been the subject of much research.

The simplest treatment method is to consider the interference as simple thermal noise. This treatment method is only acceptable, however, if the interference level is low. It should be noted that most power allocation algorithms are based on this assumption.

Other treatment methods allow interference to be reduced by decoding the information signal from the interfering call(s). This assumes that the receiving terminal knows the codes, having been used to code them. Among these methods are the parallel or PIC (Parallel Interference Canceler) or serial (Successive Interference Canceler) type interference reduction schemes well known to the person skilled in the art.

Another conventional approach for reducing the interference level is to implement an adaptive power allocation (adaptive power control) scheme. Such a method allows controlling the power levels of the different transmitting terminals as to guarantee a predetermined service quality to the different users. This service quality can be measured in terms of throughput, of latency, of packet error rate, of spatial coverage, etc. as the case may be. The parameter(s) used to measure it is/are conventionally termed the quality metric. As a general rule, a call by a user requires a minimum service quality which is taken into account or negotiated during the process of admitting the user into the cell. This minimum service quality is expressed in the form of a constraint on the service quality metric: latency below a threshold, throughput over a guaranteed minimum, etc. Power allocation is then performed so as to satisfy the constraint on the service quality metric.

Lastly, power allocation can be undertaken in a centralized fashion (Centralized Power Allocation) by a specific node of the network, the NC (Network Controller), or in distributed fashion (Distributed Power Allocation) within each terminal. The principal drawback of the centralized approach is to require the transmission by the terminals of a considerable quantity of information to the control node, particularly that relating to the coefficients of the channel between the transmitting terminals and the receiving terminals, or CSI (Channel State Indicator).

A distributed power allocation method is known from the article by Jong-Shi Pang et al. entitled "Distributed power allocation with rates constraints in Gaussian parallel interference channels" published in the IEEE *Trans. on Information Theory*, Vol. 54, No. 8, August 2008, pages 3471-3489.

The power allocation methods, distributed or not, generally assume that the interference is comparable to thermal noise. This assumption, however, is very often pessimistic, so that the transmitting powers allocated can be noticeably greater than those which would be needed to obtain the desired service quality. This allocation therefore leads to unnecessary energy consumption and, for uplinks, to a reduction in the battery life of the terminals.

Consequently a first object of the invention is to propose a distributed power allocation method which allows the output powers of the terminals to be reduced for a given service quality constraint.

A subsidiary object of the invention is to propose a distributed power allocation method taking into account the types of interference between calls.

DESCRIPTION OF THE INVENTION

The present invention is defined by a power allocation method for a wireless telecommunication system including at least one first couple of terminals consisting of a first transmitting terminal and a first receiving terminal, and of a second couple of terminals consisting of a second transmitting terminal and a second receiving terminal, a first call between the terminals of the first couple using the same transmission resources as a second call between the terminals of the second couple, such that the two calls interfere with one another, the first call being required to satisfy a first prescribed throughput and the second call being required to satisfy a second prescribed throughput. According to this method:

the output powers of the first and second transmitting terminals are initialized to predetermined values;
a plurality of iterations is carried out until a stop criterion is satisfied, each iteration including a first plurality of steps performed by the first couple of terminals, followed by a second plurality of steps performed by the second couple of terminals, the first plurality of steps comprising:
(a1) an estimate by the first receiving terminal of the signal-to-noise ratio and of the interference-to-noise ratio, the signal being that of the first call and the interference being induced by the second call;
(b1) a calculation of the minimum output power of the first transmitting terminal allowing a first prescribed throughput, based on the ratios estimated in the preceding step;
(c1) an update of the output power of the first transmitting terminal to the value thus calculated;
the second plurality of steps comprising:
(a2) an estimate by the second receiving terminal of the signal-to-noise ration and of the interference-to-noise ratio, the signal being that of the second call and the interference being induced by the first call;
(b2) a calculation of the minimal output power of the second transmitting terminal allowing the second prescribed throughput, based on the ratios estimated in the preceding step;
(c2) an update of the output power of the second transmitting terminal to the value thus calculated.

The minimum output power of the first receiving terminal can be obtained at step (b1) by performing a first partition of an interference diagram of the first call into different zones, each zone corresponding to a distinct type of treatment of the interference, by calculating, based on the first and second prescribed throughputs, a function giving the minimum signal-to-noise ratio allowing treatment of the interference in each of said zones, and by determining the image by this function of the interference-to-noise ratio measured in step (a1).

The minimum output power, $P_1^{(n)}$, of the first transmitting terminal can be calculated in the $n^{th}$ iteration by:

$$P_1^{(n)} = \lambda_1(\delta_1^{(n)}) \frac{N_0}{|g_{11}|^2}$$

where $\lambda_1$ is said first function, $N_0$ is the thermal noise power and $g_{11}$ is the channel coefficient of the first call, estimated by the first receiving terminal, and $\delta_1^{(n)}$ is the interference-to-noise ratio measured at step (a1) of the $n^{th}$ iteration.

The calculation of the minimum output power $P_1^{(n)}$ is performed by the first receiving terminal. Alternatively, this calculation can be performed by the first transmitting terminal.

Similarly, the minimum output power of the second receiving terminal is obtained at step (b2) by performing a second partition of an interference diagram of the second call into different zones, each zone corresponding to a distinct type of treatment of the interference, by calculating, based on the first and second prescribed throughputs, a second function giving the minimum signal-to-noise ratio allowing treatment of the interference in each zone of the second partition, and by determining the image by this second function of the interference-to-noise ratio measured in step (a2).

The minimum output power, $P_2^{(n)}$, of the second transmitting terminal can be calculated at the $n^{th}$ iteration by:

$$P_2^{(n)} = \lambda_2(\delta_2^{(n)}) \frac{N_0}{|g_{22}|^2}$$

where $\lambda_2$ is said second function, $N_0$ is the thermal noise power and $g_{22}$ is the channel coefficient of the second call, estimated by the second receiving terminal and $\delta_2^{(n)}$ is the interference-to-noise ratio measured in step (a2) of the $n^{th}$ iteration. The calculation of the minimum output power $P_2^{(n)}$ can be performed by the second receiving terminal. Alternatively, this calculation can be carried out by the second transmitting terminal.

The invention also relates to a power allocation method for a wireless telecommunication system comprising a plurality of couples of terminals, each couple consisting of a transmitting terminal and of a receiving terminal, in which the same output power ($P^{com}$) is initially allocated to the transmitting terminals of said couples, and for a call, called the first call, between the transmitting and receiving terminals of a couple, called the first couple, a call, called the second call, is determined between the transmitting and receiving terminals of the couple, which induces the highest level of interference with the first call, said first and second couples forming a pair, and the allocation of power to the first and second terminals is then performed by means of the allocation method as described above.

It is then possible to allocated a reduced output power ($P^{min}$) to transmitting terminals other than those belonging to said pair during the time when the first and second calls are active and the estimation of the interference induced by the calls outside said pair are then integrated into the estimate of the thermal noise.

Alternatively, it is possible to allocate a zero power output to the transmitting terminals other than those belonging to said pair during the time when the first and second calls are active.

In both cases, the first couple of terminals can be selected in turn from among the couples of terminals of said plurality.

Alternatively, the first couple of terminals can be selected from among the couples of terminals of said plurality according to a degree of urgency, an order of priority or a transmission channel quality factor.

BRIEF DESCRIPTION OF THE DRAWINGS

Other features and advantages of the invention will appear upon reading a preferred embodiment of the invention, made with reference to the appended figures in which.

DETAILED DESCRIPTION OF PARTICULAR EMBODIMENTS

We consider here a wireless communication system comprising a plurality of couples of transmitting terminals and receiving terminals and will assume that a call between the terminals of one couple can interfere with a call between the terminals of another couple, for example because said two calls use common transmission resources (intraband interference). The wireless communication system can for example be a cellular communication system or an ad hoc communication system.

For the sake of simplifying the presentation, we will first situate ourselves in the case of a system comprising only two terminal couples, as illustrated in FIG. 1.

Figure 2:
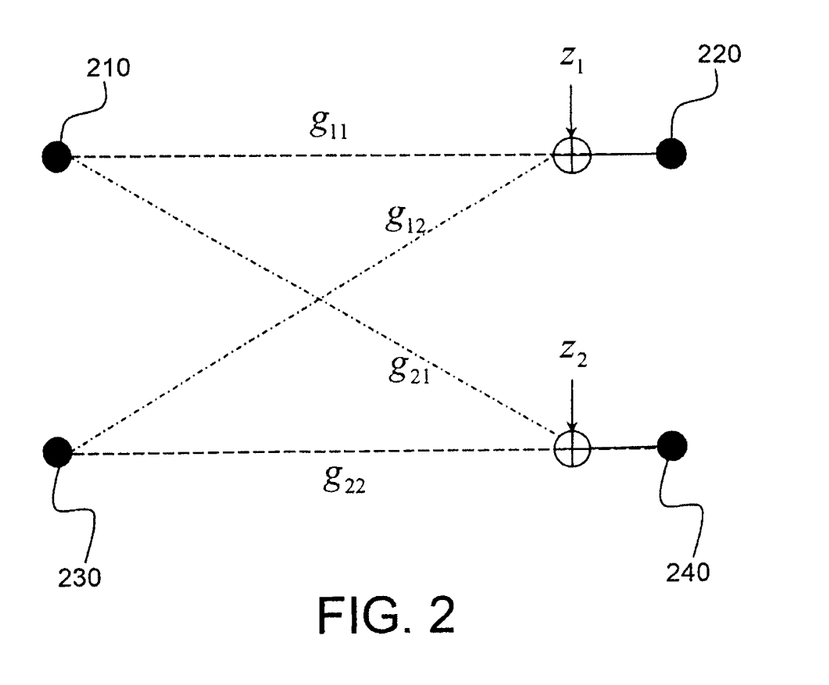
FIG. 2 shows schematically a model of the cellular communication system of FIG. 1.

FIG. 2 shows a model of the telecommunication system of FIG. 1.

Considering $x_1$, $x_2$, the signals respectively transmitted by the transmitting terminals 210 and 230, and $y_1$, $y_2$, the signals respectively received by the receiving terminals 220 and 240, we have:

$$y_1 = g_{11}x_1 + g_{12}x_2 + z_1$$

$$y_2 = g_{21}x_1 + g_{22}x_2 + z_2 \quad (1)$$

where $z_1$, $z_2$ are samples of Gaussian white noise, $g_{11}$, $g_{21}$ are the channel coefficients between the transmitting terminal 210 and the receiving terminals 220 and 240, respectively and $g_{22}$, $g_{12}$ are the channel coefficients between the transmitting terminal 230 and the receiving terminals 240 and 220, respectively.

It will be understood that the interference between calls is represented in (1) by the cross terms.

For the first call, the respective powers of the information signal and the interference due to the second call are respectively $|g_{11}|^2 P_1$ and $|g_{12}|^2 P_2$.

It will be noted that this model is similar to the conventional model of the two-user multiple-access channel or MAC as described for example in the article by Shih-Chun Chang et al. entitled "Coding for T-User Multiple-Access Channels," IEEE *Transactions on Information Theory*, vol. IT-25, no. 6, pp. 684-691, November 1979.

It differs from it fundamentally, however, in that while in the MAC model the receiving terminals receive useful information, not interference on the "crossed" channels.

The signal-to-noise ratio (SNR) at the first receiver can be expressed in the form:

$$\gamma_1 = |g_{11}|^2 \frac{P_1}{N_0} \quad (2)$$

Similarly, the interference-to-noise ratio at the first receiving terminal is none other than:

$$\delta_1 = |g_{12}|^2 \frac{P_2}{N_0} \quad (3)$$

In the same fashion, the signal-to-noise and interference-to-noise ratios at the second receiving terminal can respectively be written as:

$$\gamma_2 = |g_{22}|^2 \frac{P_2}{N_0} \quad (4)$$

$$\delta_2 = |g_{21}|^2 \frac{P_1}{N_0} \quad (5)$$

It will be noted that the following relations are satisfied:

$$\delta_1 = f_2 \gamma_2 \text{ and } \delta_2 = f_1 \gamma_1 \quad (6)$$

where $$f_1 = \frac{|g_{21}|^2}{|g_{11}|^2} \text{ and } f_2 = \frac{|g_{12}|^2}{|g_{22}|^2}. \quad (6')$$

In what follows, $\rho_1$ and $\rho_2$ denote the respective throughputs of the first and second call, and we introduce the variables $C_1 = 2^{\rho_1} - 1$, $C_2 = 2^{\rho_2} - 1$ and $C_{12} = 2^{\rho_1 + \rho_2} - 1$.

For a given output couple $(\rho_1, \rho_2)$, several interference regimes can be distinguished, each regime giving rise to a distinct treatment. More precisely, of the first call is considered, interference can be classified into three possible regimes:

Schematically, in a first regime, the interference power due to the second call is weaker than the power of the information signal received at the first receiving terminal. More precisely, if considered in terms of capacity in the Shannon sense, the signal-to-noise plus interference ratio in the direct channel between the transmitting terminal 210 and the receiver 220 allows passage of the throughput $\rho_1$ while the signal-to-noise ratio on the "crossed" channel between the transmitting terminal 230 and the receiving terminal 220 does not allow the throughput $\rho_2$ to pass (the "crossed" channel is in a cutoff situation in the information theory sense), in other words:

$$\rho_1 \leq \log_2(1 + SINR_{11}) = \log_2\left(1 + \frac{\gamma_1}{1 + \delta_1}\right) \quad (7)$$

and $$\rho_2 > \log_2(1 + INR_{12}) = \log_2(1 + \delta_1) \quad (8)$$

where $SINR_{11}$ and $INR_{12}$ are respectively the signal-to-noise plus interference and the interference-to-noise ratio at the first receiving terminal.

The constraints on $\delta_1$ and $\gamma_1$ relative to the first regime are deduced from (7) and (8):

$$\gamma_1 \geq C_1(1 + \delta_1) \quad (9)$$

$$\delta_1 < C_2 \quad (10)$$

Conversely, in a third regime, the interference power is noticeably greater than that of the information signal received by the first receiving terminal. Given that the interference is due to the second call, it is proposed to first decode the information signal of the second call, to estimate the interference due to said call and to subtract it from the signal received.

The information signal of the first call is then decoded from the resulting signal, with the interference removed.

In this regime, in a first step the signal from the first call is considered as thermal noise and the information signal of the second call is decoded. A situation is then encountered which is symmetrical to that of the first regime and the expression (7) is to be replaced by:

$$\rho_2 \leq \log_2(1 + SINR_{12}) = \log_2\left(1 + \frac{\delta_1}{1 + \gamma_1}\right) \quad (11)$$

where $SINR_{12}$ is the "signal-to-noise" ratio at the receiving terminal 220 in which the signal is heard as the information signal of the second call.

In a second step, once the contribution of the second call is subtracted from the signal received, the case of a signal burdened with only thermal noise is encountered, or in other words:

$$\rho_1 \leq \log_2(1 + SNR_{11}) = \log_2(1 + \gamma_1) \quad (12)$$

where $SNR_{11}$ is the signal-to-noise ratio after elimination of the interference due to the second call.

The expressions (11) and (12) result in the following constraints on $\gamma_1$ and $\delta_1$:

$$\gamma_1 \leq \frac{\delta_1}{C_2} - 1 \quad (13)$$

and $$\gamma_1 \geq C_1 \quad (14)$$

Finally, in a second regime, the interference power is of the same order as that of the information signal. It is then proposed to jointly decode the information signal of the first call and the information signal of the second call at the first receiving terminal. The joint decoding of the two information signals can, for example, be performed by means of a PIC scheme or a maximum-likelihood decoding scheme of the of the MMSE-GDFE type (Minimum Mean Square Error-Generalized Decision Feedback Equalizer), in a manner known per se.

This interference regime is intermediate between the first and the third to the extent that the throughput ρ2 no longer satisfies (8) and (11), or in other words:

$$\log_2\left(1 + \frac{\delta_1}{1 + \gamma_1}\right) < \rho_2 \leq \log_2(1 + \delta_1) \quad (15)$$

However, joint decoding presupposes that the throughputs of the first and second calls can be routed through the channel consisting of the direct channel and the crossed channel, that is:

$$\rho_1 + \rho_2 \leq \log_2(1 + \gamma_1 + \delta_1) \quad (16)$$

The constraints on $\gamma_1$ and $\delta_1$ relative to the second regime are deduced from (15) and (16):

$$C_2 \leq \delta_1 < C_2(1 + \gamma_1) \quad (17)$$

and $$\gamma_1 \geq C_{12} - \delta_1 \quad (18)$$

Figure 3:
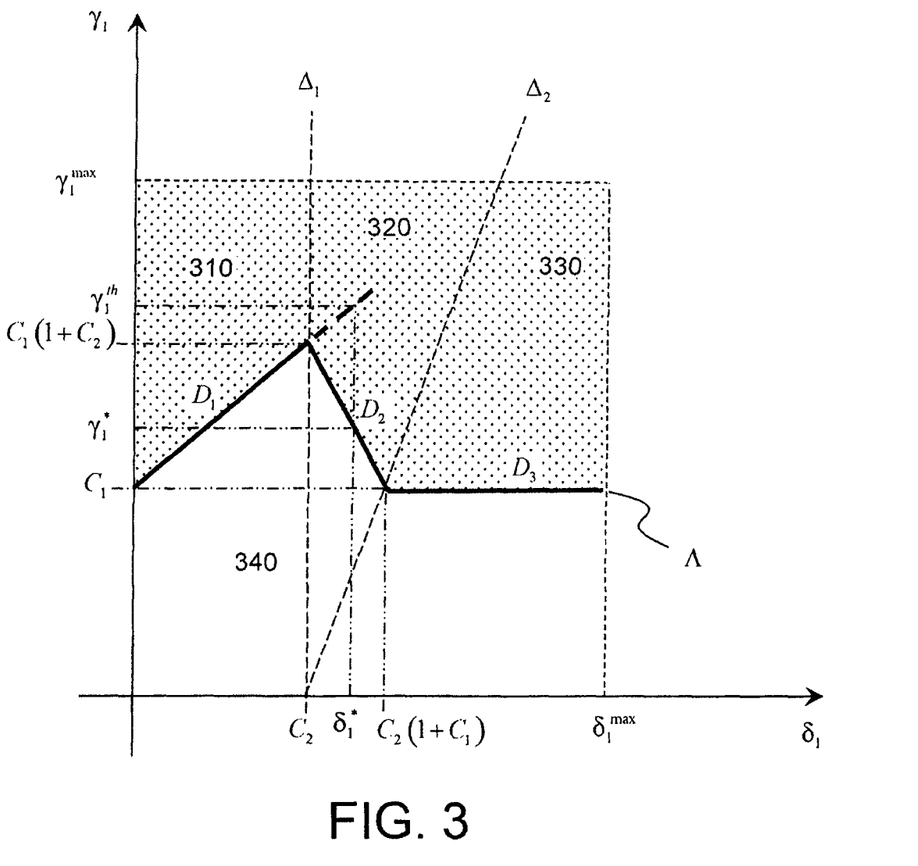
FIG. 3 shows schematically a first interference diagram for a first call.

FIG. 3 shows in interference diagram in which the interference-to-noise ratio $\delta_1$ is plotted in the abscissa and the power to noise ratio $\gamma_1$ in the ordinate.

This diagram is obtained for given throughput values $\rho_1$ and $\rho_2$, and consequently for given values of $C_1, C_2, C_{12}$.

The ratio $\gamma_1$ varies from 0 to $\gamma_1^{max} = |g_{11}|^2 P_1^{max}/N_0$ and the ratio $\delta_1$ varies from 0 to $\delta_1^{max} |g_{12}|^2 P_2^{max}/N_0$ where $P_1^{max}$ and $P_2^{max}$ are the maximum output powers of terminal 210 and 230, respectively.

The straight lines $\Delta_1$ and $\Delta_2$ defined by the equations $\delta_1 = C_2$ (see (10)) and $$\gamma_1 = \frac{\delta_1}{C_2} - 1$$

(see (13)) bound the three interference regimes. The straight lines $D_1, D_2, D_3$, respectively defined by the equations $\gamma_1 = C_1(1 + \delta_1)$ (see (9)); $\gamma_1 = C_{12} - \delta_1$ (see (18)); $\gamma_1 = C_1$ (see (14)); give the lower bound of power, denoted $\Lambda$, for each of these regimes. The zone 310 corresponding to the first interference regime is bounded by the straight lines $D_1$ and $\Delta_1$ as well as the coordinate axes; that corresponding to the second interference regime, 320, is bounded by the straight lines $\Delta_1, \Delta_2$ and $D_2$, and finally that, 330, corresponding to the third interference regime is bounded by $\Delta_2$ and $D_3$.

Below the lower bound $\Lambda$ is a fourth zone 340 in which it is not possible to treat the interference for the desired quality of service, here for the throughputs $\rho_1$ and $\rho_2$. Another transmission resource can then be used, for example another transmission time interval, to eliminate the interference between the two calls.

If the throughput of the first or of the second call varies, the parameters of the equations of the straight lines $D_1, D_2, D_3$ and $\Delta_1, \Delta_2$ also vary, and consequently the zones corresponding to the different interference regimes are altered.

For given throughputs $\rho_1$ and $\rho_2$, the current interference regime can be determined based on an estimate, at the receiver, of the power of the information signal, of the interference power and of that of the thermal noise, and the processing related to that zone can be performed.

In addition, as indicated in the figure, for given throughputs $\rho_1$ et $\rho_2$, there can be determined, for each interference power, $\delta^*_1$, the lowest value of $\gamma_1$, designated here by $\gamma^*_1$, allowing this interference to be treated. In other words, for given terminal 230 output power, the minimum power $$P_1^* = \frac{N_0}{|g_{11}|^2} \gamma_1^*$$

can be allocated to the transmitting terminal 210. It will be noted that if located in the zone 320 or 330, this value of the allocated power is much lower than that, designated here by $\gamma_1^{th}$, which it would have been necessary to allocate if the interference had been likened to simple thermal noise.

Figure 4:
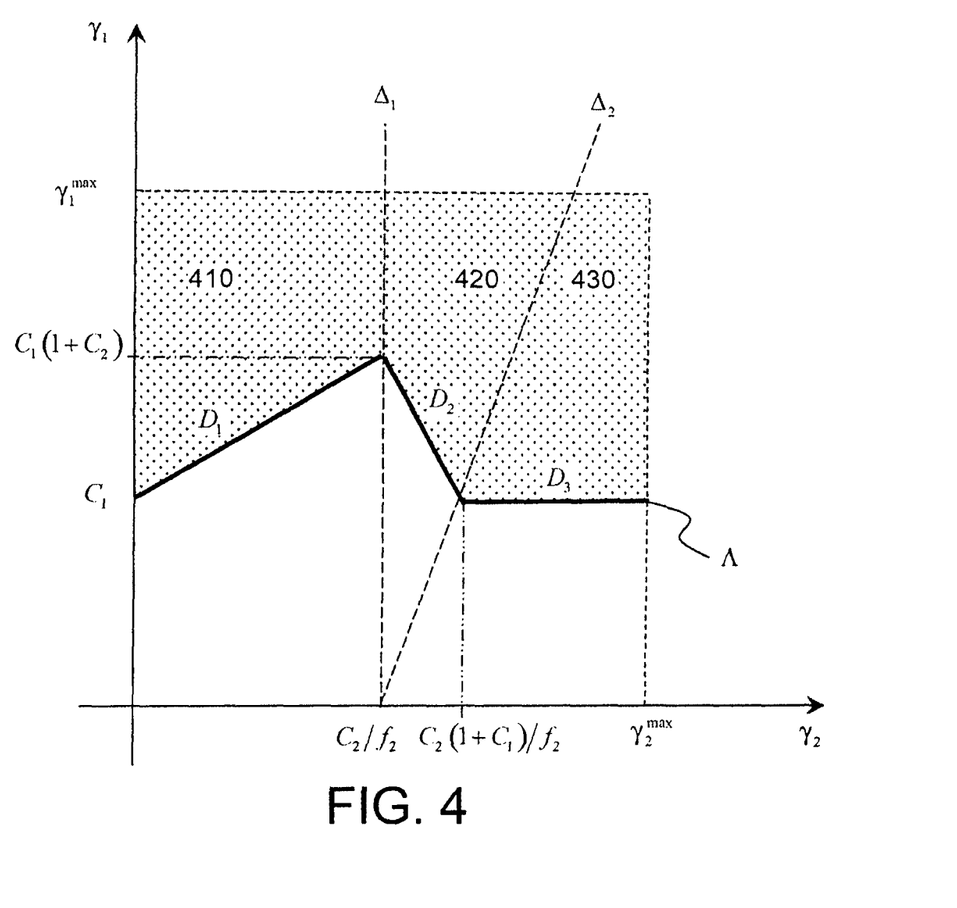
FIG. 4 shows schematically a second interference diagram for the same call.

FIG. 4 shows an interference diagram in which are shown, this time in the abscissa, the power to noise ratio $\gamma_1$ and in the ordinate the power to noise ratio $\gamma_1$.

The ratio $\gamma_1$ varies from 0 to $\gamma_1^{max} = |g_{11}|^2 P_1^{max}/N_0$ and the ratio $\gamma_2$ varies from 0 to $\gamma_2^{max} = |g_{22}|^2 P_2^{max}/N_0$.

The inequalities (9), (13) and (18) can be rewritten in terms of the ratios $\gamma_1$ and $\gamma_2$:

$$\gamma_1 \geq C_1(1 + f_2\gamma_2) \quad (19)$$

$$\gamma_1 \leq \frac{f_2}{C_2}\gamma_2 - 1 \quad (20)$$

$$\gamma_1 \geq C_{12} - f_2\gamma_2 \quad (21)$$

Similarly to FIG. 3, the straight lines $\Delta_1$ and $\Delta_2$ defined by the equations $\gamma_2 = C_2/f_2$ (see (10)) and $$\gamma_1 = \frac{f_2}{C_2}\gamma_2 - 1$$

(see (20)), bound the three interference regimes and the straight lines $D_1$, $D_2$, $D_3$, respectively defined by the equations $\gamma_1 = C_1(1+ff_2\gamma_2)$ (see (19)); $\gamma_1 = C_{12} - f_2\gamma_2$ (see (21)); $\gamma_1 = C_1$ (see (14)); give the lower bound of the power, $\Lambda$. The zones corresponding to the different interference regimes are designated 410, 420 and 430.

Figure 5:
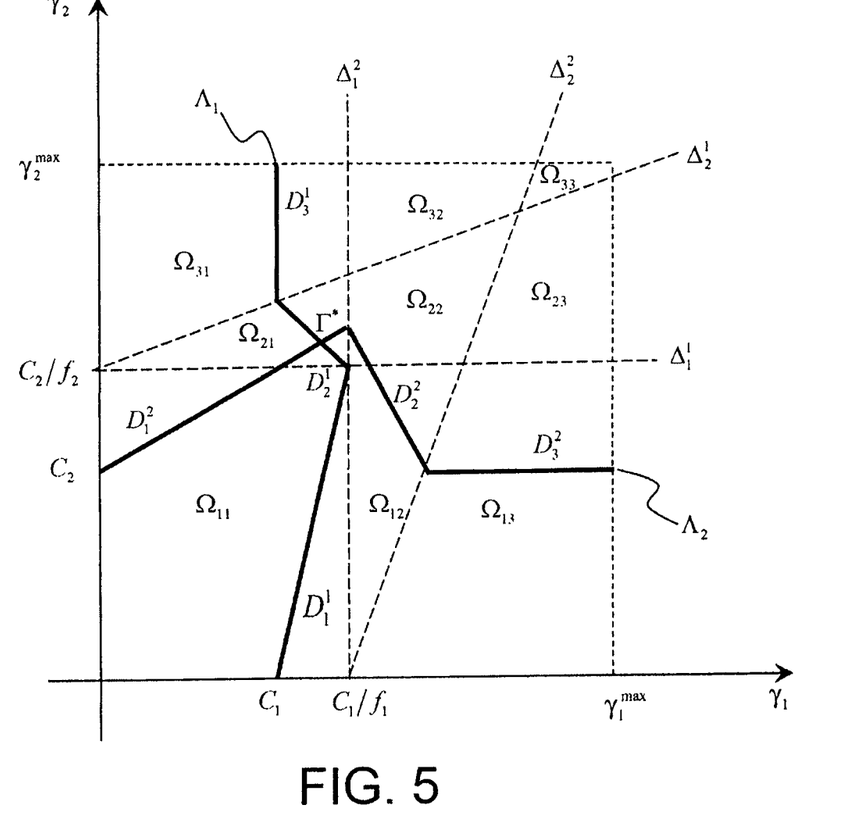
FIG. 5 shows schematically an interference diagram for a first and a second call.

FIG. 5 shows an interference diagram identical to that of FIG. 4 in which have been shown the various interference regimes for the two calls. The signal-to-noise ratio $\gamma_1$ is plotted in the abscissa and the signal-to-noise ratio $\gamma_2$ in the ordinate. Nine distinct zones are obtained, by intersection of the three zones relating to the first call and of the three zones relating to the second call. This nine zones are denoted $\Omega_{pq}$, $1 \leq p \leq 3$, $1 \leq q \leq 3$, where p and q respectively index the interference regime of the first and of the second call. The different zones are bounded by the straight lines $\Delta_1^1$, $\Delta_2^1$, $\Delta_1^2$, $\Delta_2^2$, $D_1^1$, $D_2^1$, $D_3^1$, and $D_1^2$, $D_2^2$, $D_3^2$, the upper index indicating the call here.

The lower bounds, $\Lambda_1$ and $\Lambda_2$, relating to the two calls, intersect at a point $\Gamma^* = (\gamma^*_1, \gamma^*_2)$. For given communication throughputs $\rho_1$ and $\rho_2$, the point $\Gamma^*$ corresponds to the minimum power allocation. Generally, the zone $\Omega_{p^*q^*}$ in which the point $\Gamma^*$ is situated, provides the interference regimes $p^*$, $q^*$ of the two calls and consequently the corresponding types of treatment. It will be noted that in the case illustrated, it is the zone $\Omega_{21}$ which contains the operating point, in other words for decoding the information signal of the first call a joint decoding will be performed, and for decoding the information signal of the second call the first call will be likened to thermal noise.

For each call i=1,2, the interference diagram partition denoted ($\omega_1^i$, $\omega_2^i$, $\omega_3^i$) is defined by:

$$\omega_1^i \square \{(\gamma_i, \gamma_j) | 0 < \gamma_j < C_j/f_j\} \quad (22)$$

$$\omega_2^i \square \{(\gamma_i, \gamma_j) | C_j/f_j \leq \gamma_j \leq (\gamma_i+1)C_j/f_j\} \quad (23)$$

$$\omega_3^i \square \{(\gamma_i, \gamma_j) | \gamma_j > (\gamma_i+1)C_j/f_j\} \quad (24)$$

where $j \neq i$ is the index of the interfering call.

This partition is equivalently expressed using $(\gamma_i, \delta_i)$ coordinates:

$$\omega_1^i \square \{(\gamma_i, \delta_i) | \delta_i < C_j\} \quad (22')$$

$$\omega_2^i \square \{(\gamma_i, \delta_i) | C_j \leq \delta_i \leq (\gamma_i+1)C_j\} \quad (23')$$

$$\omega_3^i \square \{(\gamma_i, \delta_i) | \delta_i > (\gamma_i+1)C_j\} \quad (24')$$

In any case, the partition of the interference diagram for the two calls as a whole is obtained by means of the intersections:

$$\Omega_{pq} = \omega_p^1 \cap \omega_q^2 \quad (25)$$

Each zone is associated with an interference regime (indexed by p) of the first call and to an interference regime (indexed by q) of the second call.

Figure 6:
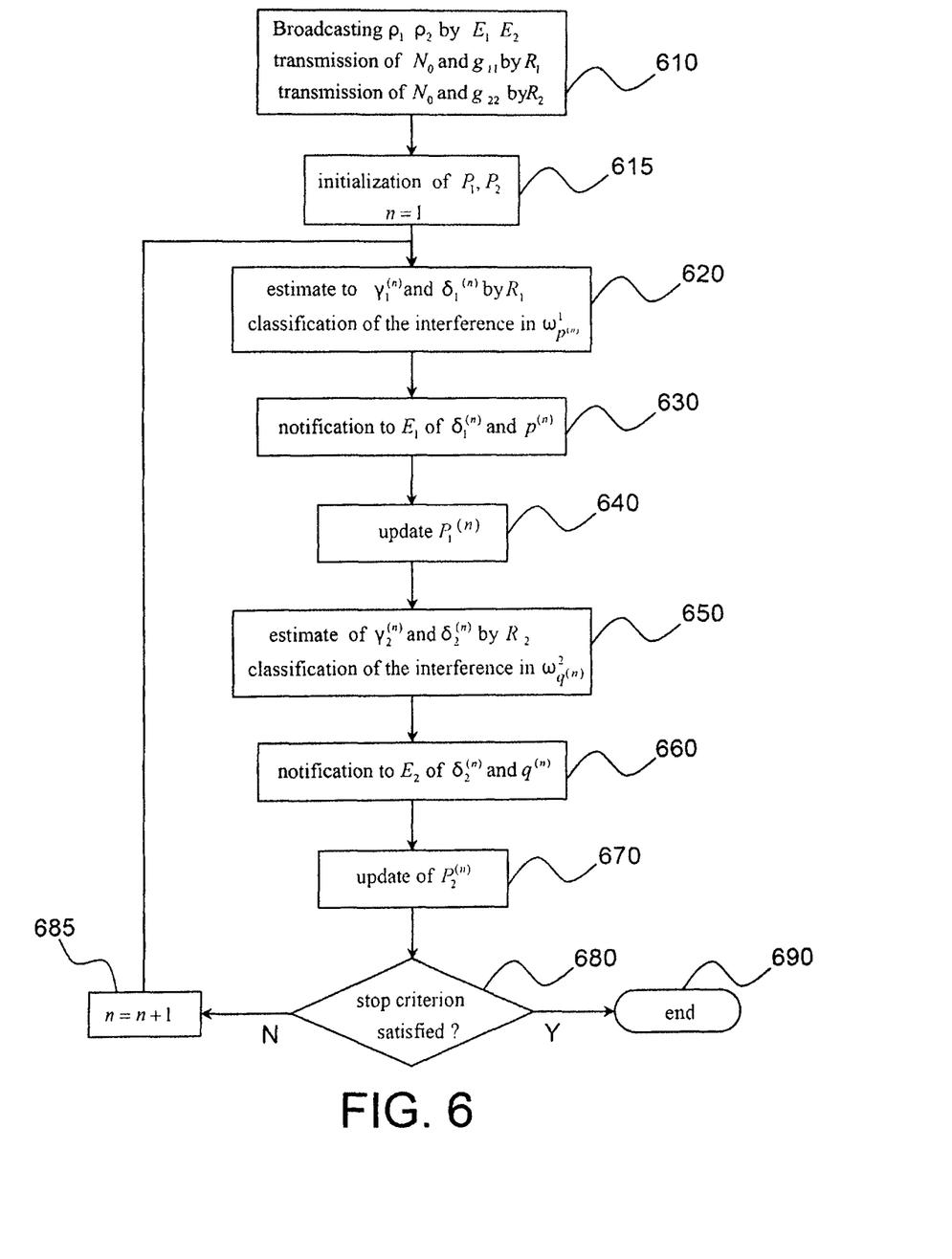
FIG. 6 shows schematically a flowchart of the distributed power allocation method according to a first embodiment of the invention.

FIG. 6 shows a distributed power allocation method according to a first embodiment of the invention. This embodiment assumes that two couples of terminals $T_1 = (E_1, R_1)$, $T_2 = (E_2, R_2)$ have been previously selected because their calls are interfering with one another.

The power allocation method proceeds iteratively, each iteration consisting of a first half-iteration performed by one of the two couples of terminals and of a second half-iteration performed by the other couple.

More precisely, in a first step 610 the transmitting terminals $E_1$ and $E_2$ distribute the prescribed throughput values $\rho_1$, $\rho_2$ or, equivalently, the values of the variables $C_1$ and $C_2$ to the other terminals. The receiving terminals $R_1$ and $R_2$ proceed with an estimate of the thermal noise $N_0$ and with a channel estimate. The terminal $R_1$ transmits to the terminal $E_1$ the values $N_0$ and $g_{11}$. Likewise, the terminal $R_2$ transmits to the terminal $E_2$ the values $N_0$ and $g_{22}$.

In a second step 615 the output powers of the transmitting terminals $E_1$ and $E_2$ are initialized at given values, $P_1^{(0)}$ and $P_2^{(0)}$, for example to maximum output power values $P_1^{max}$ and $P_2^{max}$. The index n giving the number of iterations is initialized to 1. In what follows, the $n^{th}$ iteration is assumed to be current.

At step 620, the receiving terminal $R_1$ estimates the signal-to-noise ratio, $\gamma_1^{(n)}$, and the interference-to-noise ratio $\delta_1^{(n)}$, using sequences of pilot symbols transmitted for example by the terminal $E_1$ and the terminal $E_2$ in succession. The terminal $R_1$ classifies the interference, that is it determines in which zone $\omega_{p^{(n)}}^1$ the operating point $(\gamma_1^{(n)}, \delta_1^{(n)})$ is situated.

At step 630, the terminal $R_1$ notifies the terminal $E_1$ of the value of the interference-to-noise ratio $\delta_1^{(n)}$ and the corresponding interference regime, $p^{(n)}$. This notification is performed by means of a specific message. According to one variant, only the value of the interference-to-noise ratio $\delta_1^{(n)}$ is notified to the terminal $E_1$, the last mentioned then taking upon itself the classification and the determination of the index $p^{(n)}$.

At step 640, the terminal $E_1$ updates the output power $P_1^{(n)}$ as a function of $\delta_1^{(n)}$ and $p^{(n)}$. More precisely, the power $P_1^{(n)}$ is obtained by means of the function $\lambda_1$ giving the lower bound of power, defined by intervals:

$$\lambda_1(\delta_1^{(n)}) = C_1(1 + \delta_1^{(n)}) \text{ for } \delta_1^{(n)} \in \omega_1^1 \quad (26)$$
$$\lambda_1(\delta_1^{(n)}) = C_{12} - \delta_1^{(n)} \text{ for } \delta_1^{(n)} \in \omega_2^1$$
$$\lambda_1(\delta_1^{(n)}) = C_1 \text{ for } \delta_1^{(n)} \in \omega_3^1$$

using $$P_1^{(n)} = \lambda_1(\delta_1^{(n)}) \frac{N_0}{|g_{11}|^2} \quad (27)$$

According to one variant, the calculation of step 640 is performed by the receiving terminal $R_1$ and the result of (27) is then transmitted to the terminal $E_1$. In this case, the receiving terminal $R_1$ do not need to transmit the thermal noise power $N_0$ and the channel coefficient $g_{11}$ in step 610. Whichever option is chosen, the terminal $E_1$ transmits at the updated output power $P_1^{(n)}$.

It will be understood that steps 620 through 640 correspond to the first half-iteration.

At step 650, the receiving terminal $R_2$ estimates the signal-to-noise ratio, $\gamma_2^{(n)}$, as well as the interference-to-noise ratio $\delta_2^{(n)}$, by means of sequences of pilot symbols, transmitted for example by terminal $E_2$ and terminal $E_1$ in succession. Terminal $R_2$ deduces from it in which zone $\omega_q^{(n)2}$ the operating point $(\gamma_2^{(n)}, \delta_2^{(n)})$ is situated.

At step 660, terminal $R_2$ notifies terminal $E_2$ of the value of the interference-to-noise ratio $\delta_2^{(n)}$ and the corresponding interference regime, $q^{(n)}$.

At step 670, terminal $E_2$ updates the output power $P_2^{(n)}$ as a function of $(\delta_2^{(n)}$ and $q^{(n)}$. More precisely, the power $P_2^{(n)}$ is obtained by means of the function $\lambda_2$ giving the lower bound of power, defined by intervals:

$$\lambda_2(\delta_2^{(n)}) = C_2(1 + \delta_2^{(n)}) \text{ for } \delta_2^{(n)} \in \omega_1^2 \quad (28)$$
$$\lambda_2(\delta_2^{(n)}) = C_{12} - \delta_2^{(n)} \text{ for } \delta_2^{(n)} \in \omega_2^2$$
$$\lambda_2(\delta_2^{(n)}) = C_2 \text{ for } \delta_2^{(n)} \in \omega_3^2$$

using $$P_2^{(n)} = \lambda_2(\delta_2^{(n)}) \frac{N_0}{|g_{22}|^2} \quad (29)$$

According to the aforementioned variant, the calculation of step 670 is performed by the receiving terminal $R_2$ and the result of (29) is then transmitted to terminal $E_2$. In this case, the receiving terminal $R_2$ need not transmit the thermal noise power $N_0$ and the channel coefficient $g_{22}$ in step 610. Whichever option is chosen, terminal $E_2$ transmits at the updated output power $p_2^{(n)}$.

It will be understood that steps 650 through 670 correspond to the second half-iteration.

On completion of the two half-iterations, step 680 checks whether a stop criterion is satisfied. This criterion can for instance be formulated in terms of a maximum number of iterations $K_{max}$ beyond which the algorithm stops. Alternatively, the stop criterion can be expressed in the form of a convergence measurement. For example, of we denote by $P_k^{(n)}$, k=1, 2 the output power allocated to the transmitting terminal $E_k$ in iteration n, this criterion can be expressed by:

$$\|P^{(n+1)} - P^{(n)}\| \leq \epsilon \quad (30)$$

where $P^{(n)}$ is the vector of powers allocated to the transmitting terminals in iteration n, to with $P^{(n)} = (P_1^{(n)}, P^{(n)})^T$ and $\epsilon$ is a predetermined threshold. The stop criterion can also be a combination of the two foregoing criteria, in the sense that the iterations will be stopped whenever one or the other of the criteria is satisfied.

If the stop criterion is satisfied, the power allocation ends at 690. That failing, the iteration counter is incremented in 685 and execution resumes at step 620.

Figure 7:
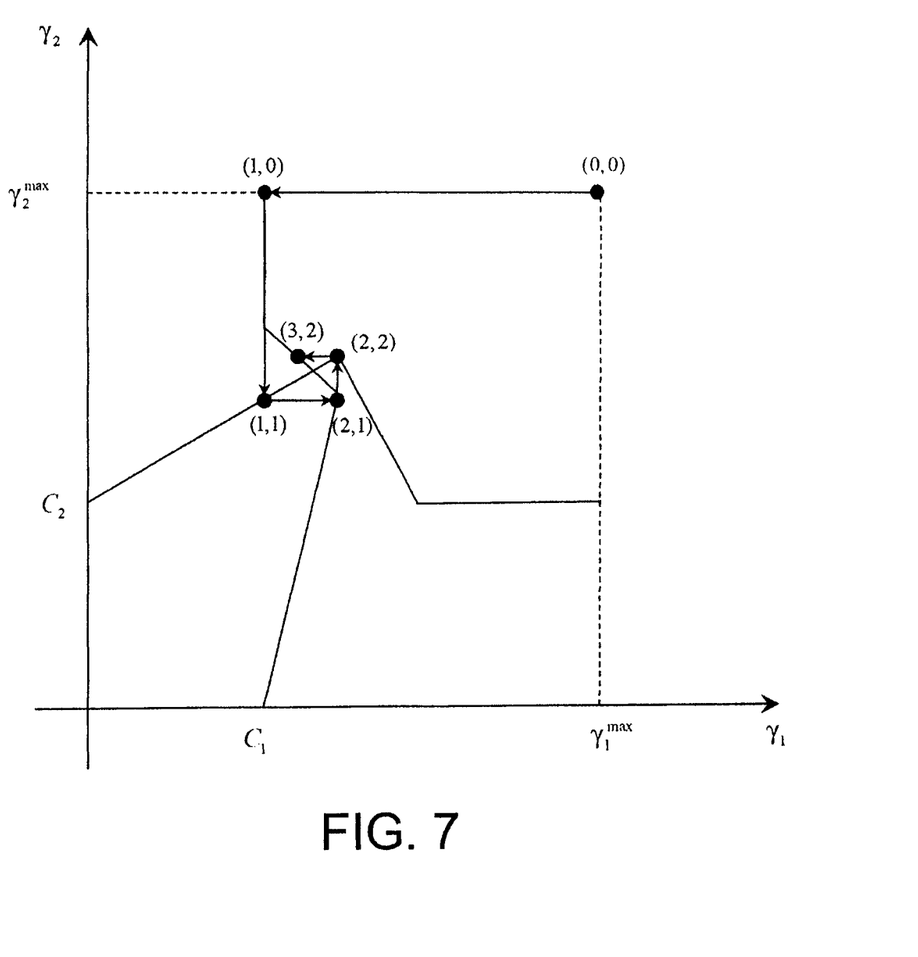
FIG. 7 shows the sequence of operating points of the first and second receiving terminals in the diagram of FIG. 5 when the method of FIG. 6 is implemented.

FIG. 7 illustrates on the interference diagram the operating points of the receiving terminals $R_1$ and $R_2$ following each half-iteration. The points are denoted here by (n', n'') where n' and n'' are the numbers of half-iterations performed by $T_1$ and $T_2$ respectively. It is noted that these points are obtained by alternate projections onto the curves $\Lambda_1$ and $\Lambda_2$.

It can be shown that as a general rule the functions $\lambda_1$ and $\lambda_2$ are k-lipschitzian with k<1. Consequently, the sequence of coordinate points $(\gamma_1^{(n)}, \gamma_2^{(n)})$ converges toward a fixed point ($\square^2$ being a Banach space). It can be shown that this fixed point is none other than the point of intersection of the curves $\Lambda_1$ and $\Lambda_2$, denoted $\Gamma^* = (\gamma^*_1, \gamma^*_2)$ on the diagram. This point gives the optimal power allocation taking into account the throughput prescriptions $\rho_1$ and $\rho_2$.

Figure 8A:
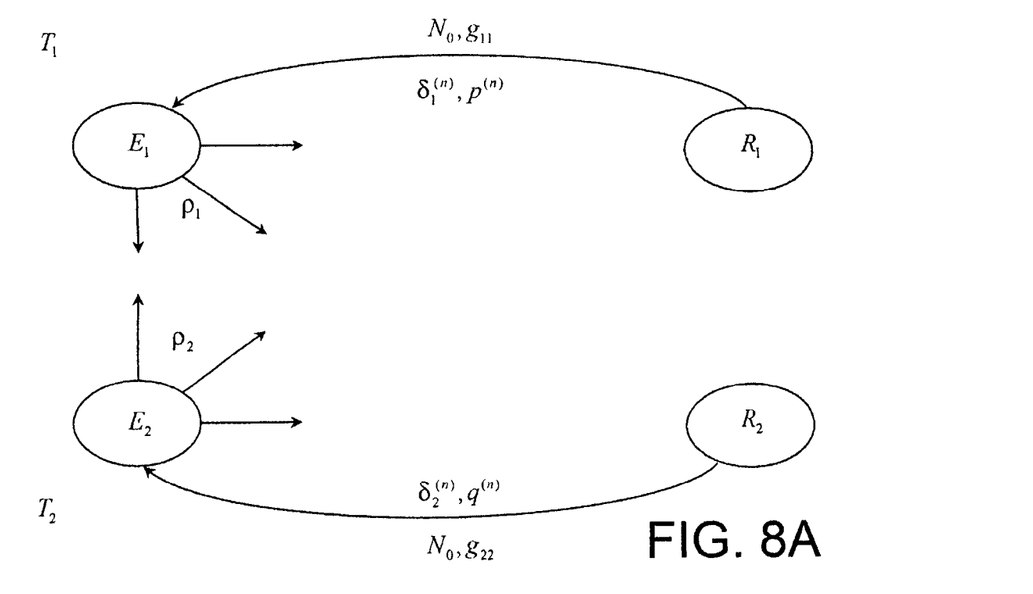
FIG. 8A shows schematically the message transmissions between transmitting and receiving terminals when the method of FIG. 6 is implemented.

FIG. 8A shows schematically the messages transmitted between the transmitting and receiving terminals of the couples $T_1 = (E_1, R_1)$ and $T_2 = (E_2, R_2)$ when the power allocation method of FIG. 6 is implemented.

During the preliminary step 610, terminals $E_1$ and $E_2$ distribute the throughput values $\rho_1$ and $\rho_2$. Alternatively, they distribute the values of the corresponding variables $C_1$ and $C_2$. The receiving terminals $R_1$ and $R_2$ send respectively to terminals $E_1$ and $E_2$ the values $N_0$, $g_{11}$ and $N_0$, $g_{22}$.

At each iteration, terminal $R_1$ transmits to terminal El the interference level $\delta_1^{(n)}$ and the index of the corresponding regime, $p^{(n)}$. Likewise terminal $R_2$ transmits to terminal $E_2$ the interference level $\delta_2^{(n)}$ and the index of the corresponding regime, $q^{(n)}$.

Figure 8B:
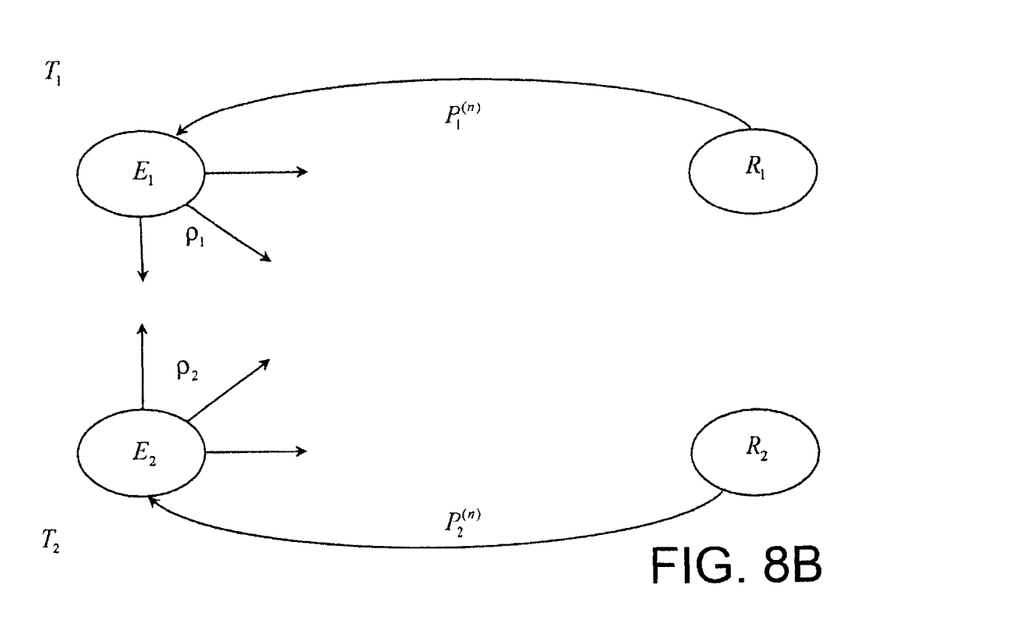
FIG. 8B shows schematically the message transmissions between transmitting and receiving terminals when a variant of the method of FIG. 6 is implemented.

FIG. 8B shows schematically the messages transmitted between the transmitting and receiving terminals of the couples $T_1 = (E_1, R_1)$ and $T_2 = (E_2, R_2)$ when the power allocation method according to the aforementioned variant is implemented.

According to this variant, the calculations of $P_1^{(n)}$ and $P_2^{(n)}$, at steps 640 and 670 respectively, are performed by terminals $R_1$ and $R_2$ instead of terminals $E_1$ and $E_2$.

In this case, the values $N_0$, $g_{11}$ and $N_0$, $g_{22}$ are not transmitted during the preliminary step 610. At each iteration, terminal $R_1$ transmit to terminal $E_1$ the updated power value $P_1^{(n)}$ in step 640, and terminal $R_2$ transmits to terminal $E_2$ the updated power value $P_2^{(n)}$ in step 670.

The variant of FIG. 8B will be preferred over that in FIG. 8A when the receiving terminals are base stations, that is for uplink calls. However, for downlink calls, the variant of FIG. 8A can be opted for to alleviate the computing load on the mobile terminals.

The power allocation method according to the first embodiment of the invention is generalized to an arbitrary number K of couples of terminals and hence to a number K of corresponding calls. The interference diagram of FIG. 4 or 5 is then constructed in a space with $K \geq 2$ dimensions and there are $P^K$ possible combinations of P interference regimes for the set of K calls on the system. The prescribed throughputs of the K calls constitute a throughput vector $\rho = (\rho_1, \ldots, \rho_K)^T$.

According to a second embodiment, not shown, the transmitting and receiving terminal couples, $T_k = (E_k, R_k)$, k=1, ..., K are grouped into pairs according to a predetermined criterion. For example, this criterion could be an order of priority, a degree of urgency, a channel quality factor, etc. or even a combination of such criteria.

Preferably, in a preliminary phase, each receiving terminal $R_k$ determines which is the call k' inducing the highest level of interference. To this end, the different transmitting terminals other than $E_k$ are for example activated in succession, allocating each of them the same output power $P^{com}$, and the reception levels obtained are compared. Couples $T_k$ and $T_{k'}$ are then paired. It will be noted that this preliminary phase requires at most $C_K^2$ measurements, given that they can be performed by successively activating the transmitting terminals $E_k$ and simultaneously measuring the levels received by the various receiving terminals other than $R_k$.

For a pair $(T_k, T_{k'})$ thus assembled, it can be assumed that the other pairs are only slightly interfering. The "residual" interference due to the other calls will be treated as thermal noise. This thermal noise will be included in the value of $N_0$ for calculating the powers $P^*_k$ and $P^*_{k'}$ to be allocated to terminals $E_k$ and $E_{k'}$.

The power allocation method described in connection with FIG. 6 can then be applied to the pairs thus constituted. More precisely, steps 610 through 670 are performed for each of these pairs. It will thus be understood that one iteration of the algorithm still consists of two half-iterations, the first couples of the different pairs performing the processing of the first half-iteration and the second couples of the same pairs performing the second half-iteration.

The stop criterion is common to all the pairs. It can be expressed as before in the form of a maximum number of iterations and/or a convergence criterion. In the latter case, the expression (30) will be used with) the vector $P^{(n)} = (P_1^{(n)}, \ldots, P_K^{(n)})^T$ of the powers allocated respectively to the K transmitting terminals in iteration n.

According to a variant not shown, the stop criterion can be specific to each pair and be satisfied independently for each of them. This makes it possible in particular to not delay the convergence of the power allocation method for well-conditioned pairs.

Advantageously, whether the allocated powers also satisfy a homogeneity criterion will also be checked. It is indeed necessary to avoid having some terminals transmitting at full power while others are reduced to virtual silence. The homogeneity criterion can in particular be expressed in terms of minimum output powers or even in terms of variation of allocated powers. If the allocated powers are not homogeneous, those not satisfying the homogeneity criterion are identified and the corresponding couples of terminals are rejected. These couples of terminals can have different transmission resources allocated to them.

According to a third embodiment, also not shown, the couples of terminals $T_k = (E_k, R_k)$, $k=1, \ldots, K$ are first paired as in the second embodiment. However, unlike the second embodiment, power allocation is carried out pair by pair, each pair being treated independently.

According to a first variant of this embodiment, it is assumed that for any pair $(T_k, T_{k'})$, the interference induced by the other calls $v \neq k$, k' is negligible. In order to ensure that this assumption is properly satisfied, zero power can be allocated to the other terminals $E_v$, $v \neq k$, k' while calls k and k' are active.

The process of selecting the active pair $(T_k, T_{k'})$ can be periodically repeated, particularly to allow for the change in the channel coefficients. It can also be repeated so as to satisfy a fairness principle, the couples constituting the pair selected last being then excluded from the selection process during a given period. This exclusion period can depend on the service quality required for the call in question, a higher service quality leading to a shorter exclusion period.

According to a second variant of this embodiment, it is assumed that for any pair $(T_k, T_{k'})$, the interference induced by calls outside of those of the pair in question can be likened to thermal noise. More precisely, the noise power $N_0$, possibly transmitted to the transmitting terminals in 610, and entering into the calculation of the signal-to-noise and interference-to-noise ratios in 620, has the power of the interference induced by calls $v \neq k$, k' added to it.

In order to ensure that this assumption is properly satisfied, a minimum power $P^{min}$ can be allocated to the other terminals $E_v$, $v \neq k$, k' while calls k and k' are active. The selection of the active pair can be performed as in the first variant.

The present invention has been described as a distributed power allocation method satisfying a given throughput constraint. The person skilled in the art will understand, however, that it can apply to a power allocation satisfying a constraint applying to any service quality parameter, for example a maximum latency time, a minimum coverage radius, a maximum error rate, etc. without thereby departing from the scope of the present invention.

The invention claimed is:

1. A power allocation method for a wireless telecommunication system including a first communication system that includes a first transmitting terminal and a first receiving terminal, and a second communication system that includes a second transmitting terminal and a second receiving terminal, a first call between the first communication system and the second communication system uses same transmission resources as a second call between the the first communication system and the second communication system, such that the first call and the second call interfere with one another, the first call being required to satisfy a first prescribed throughput and the second call being required to satisfy a second prescribed throughput, wherein the method comprises:

initializing output powers of the first and second transmitting terminals are to predetermined values;

executing a plurality of iterations until a stop criterion is satisfied, each iteration comprising a first plurality of steps executed by the first communication system, followed by a second plurality of steps carried out by the second communication system, the first plurality of steps including, (a1) estimating, by the first receiving terminal, a signal-to-noise ratio and an interference-to-noise ratio, the signal being that of the first call and the interference being induced by the second call, (b1) calculating a minimum output power of the first transmitting terminal allowing the first prescribed throughput, based on the signal-to-noise ratio and the interference-to-noise ratio estimated by the estimating executed by the first receiving terminal, and (c1) updating an output power of the first transmitting terminal to the minimum output power of the first transmitting terminal;

the second plurality of steps including, (a2) estimating, by the second receiving terminal, a signal-to-noise ratio and an interference-to-noise ratio, the signal being that of the second call and the interference being induced by the first call, (b2) calculating a minimum output power of the second transmitting terminal allowing the second prescribed throughput, based on the signal-to-noise ratio and the interference-to-noise ratio estimated by the estimating executed by the second receiving terminals, and (c2) updating an output power of the second transmitting terminal to the minimum output power of the second transmitting terminal.

2. The power allocation method according to claim 1, wherein the minimum output power of the first receiving terminal is obtained in step (b1) by performing a first partition of an interference diagram of the first call into different zones, each zone corresponding to a distinct type of treatment of the interference caused by the second call, by calculating, based on the first and second prescribed throughputs, a first function ($\lambda_1$) giving the minimum signal-to-noise ratio allowing for treatment of the interference in each of said zones to be carried out, and by determining an image by the first function of the interference-to-noise ratio estimated in step (a1).

3. The power allocation method according to claim 2, wherein the minimum output power, $P_1^{(n)}$, of the first transmitting terminal is calculated in an $n^{th}$ iteration by:

$$P_1^{(n)} = \lambda_1(\delta_1^{(n)}) \cdot \frac{N_0}{|g_{11}|^2}$$

where $\lambda_1$ is said first function, $N_0$ is a thermal noise power, $g_{11}$ is a channel coefficient of the first call, estimated by the first receiving terminal, and $\delta_1^{(n)}$ is the interference-to-noise ratio estimated in step (a1) of the $n^{th}$ iteration.

4. The power allocation method according to claim 3, wherein the calculating the minimum output power $P_1^{(n)}$ in step (b1) is performed by the first receiving terminal, and the minimum power thus calculated is transmitted to the first transmitting terminal.

5. The power allocation method according to claim 3, wherein the calculating the minimum output power $p_1^{(n)}$ in step (b1) is performed by the first transmitting terminal.

6. The power allocation method according to any one of claims 1 through 5, wherein the minimum output power of the second receiving terminal is obtained in step (b2) by performing a second partition of an interference diagram of the second call into different zones, each zone corresponding to a distinct type of treatment of the interference caused by the first call, by calculating, based on the first and second prescribed throughputs, a second function ($\lambda_2$) giving the minimum signal-to-noise ratio allowing the interference to be treated in each of the zones of the second partition, and by determining an image by the second function of the interference-to-noise ratio estimated in step (a2).

7. the power allocation method according to claim 6, wherein the minimum output power, $P_2^{(n)}$, of the second transmitting terminal is calculated in an $n^{th}$ iteration by:

$$P_2^{(n)} = \lambda_2(\delta_2^{(n)}) \cdot \frac{N_0}{|g_{22}|^2}$$

where $\lambda_2$ is said second function, $N_0$ is a thermal noise power, $g_{22}$ is a channel coefficient of the second call, estimated by the second receiving terminal, and $\delta_2^{(n)}$ is the interference-to-noise ratio estimated in step (a2) of the $n^{th}$ iteration.

8. The power allocation method according to claim 7, wherein the calculating the minimum output power $P_2^{(n)}$ in step (b2) is performed by the second receiving terminal, and the minimum output power thus calculated is transmitted to the second transmitting terminal.

9. The power allocation method according to claim 7, wherein the calculating the minimum output power $P_2^{(n)}$ in step (b2) is performed by the second transmitting terminal.

10. The power allocation method of claim 1, wherein the initializing includes initially allocating a same output power ($P^{com}$) to the first transmitting terminal and the second transmitting terminal, and the second call induces a highest level of interference on the first call.

11. The power allocation method according to claim 10, further comprising allocating a reduced output power ($P^{min}$) to transmitting terminals other than the first transmitting terminal and the second transmitting terminal while the first and second calls are active and an estimate of thermal noise includes interference induced by calls other than the first and second calls.

12. The power allocation method according to claim 10, further comprising allocating zero output power to the transmitting terminals other than the first transmitting terminal and the second transmitting terminal while the first and second calls are active.

13. The power allocation method according to one of claims 10 through 12, wherein there are a plurality of communication systems, and the method further comprises selecting the first communication system successively from among the plurality of communication systems.

14. The power allocation method according to one of claims 10 through 12, wherein there are a plurality of communication systems, and the method further comprises selecting the first communication system from among the plurality of communication systems according to a degree of urgency, an order of priority or a transmission channel quality factor.

* * * * *